Aug. 20, 1957  R. E. MILFORD  2,803,755
AUTOMATIC INSPECTION GAGE
Filed Dec. 16, 1954  5 Sheets-Sheet 1

Inventor:
Richard E. Milford,
by Merton D. Moore
His Attorney.

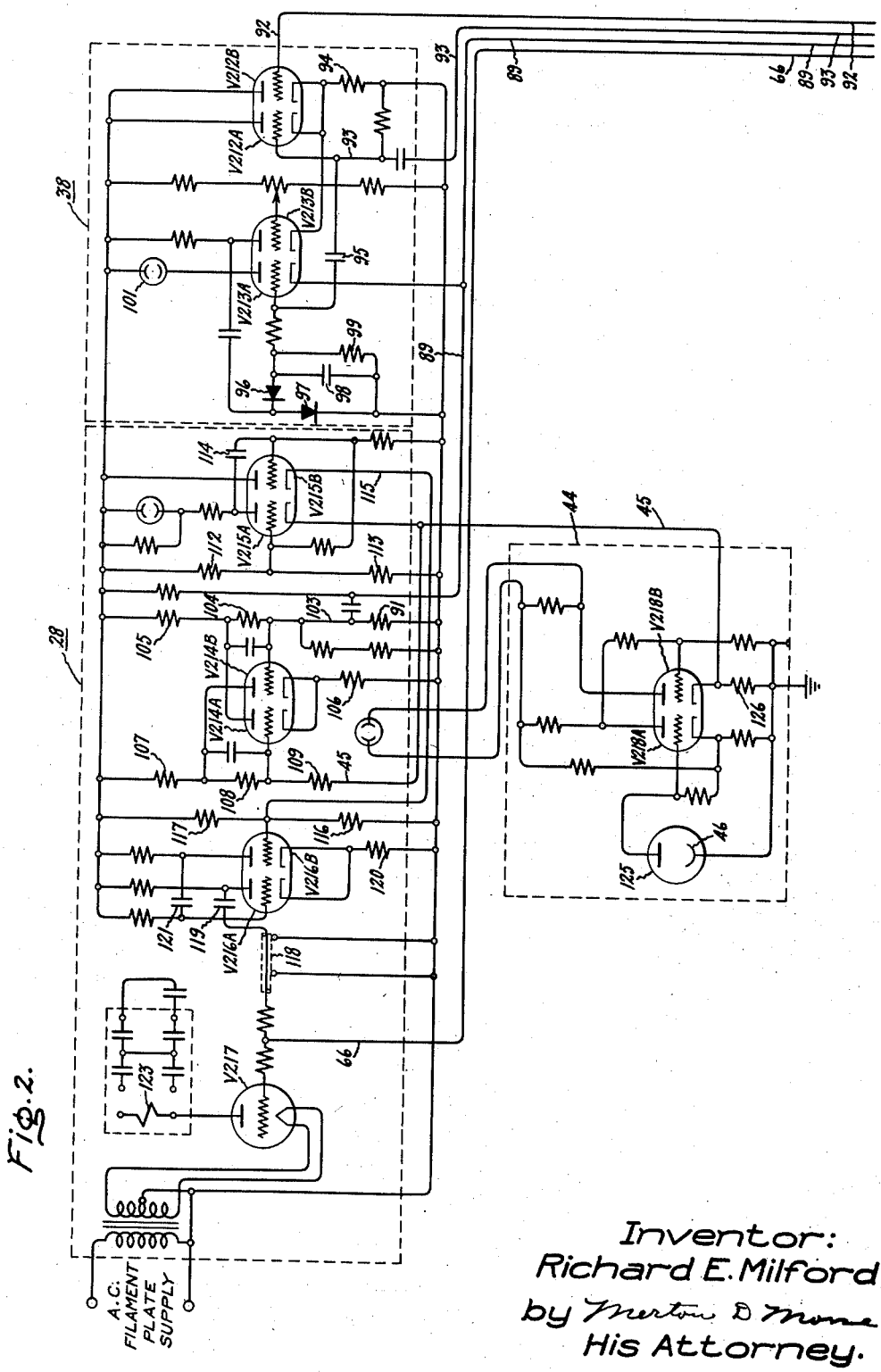

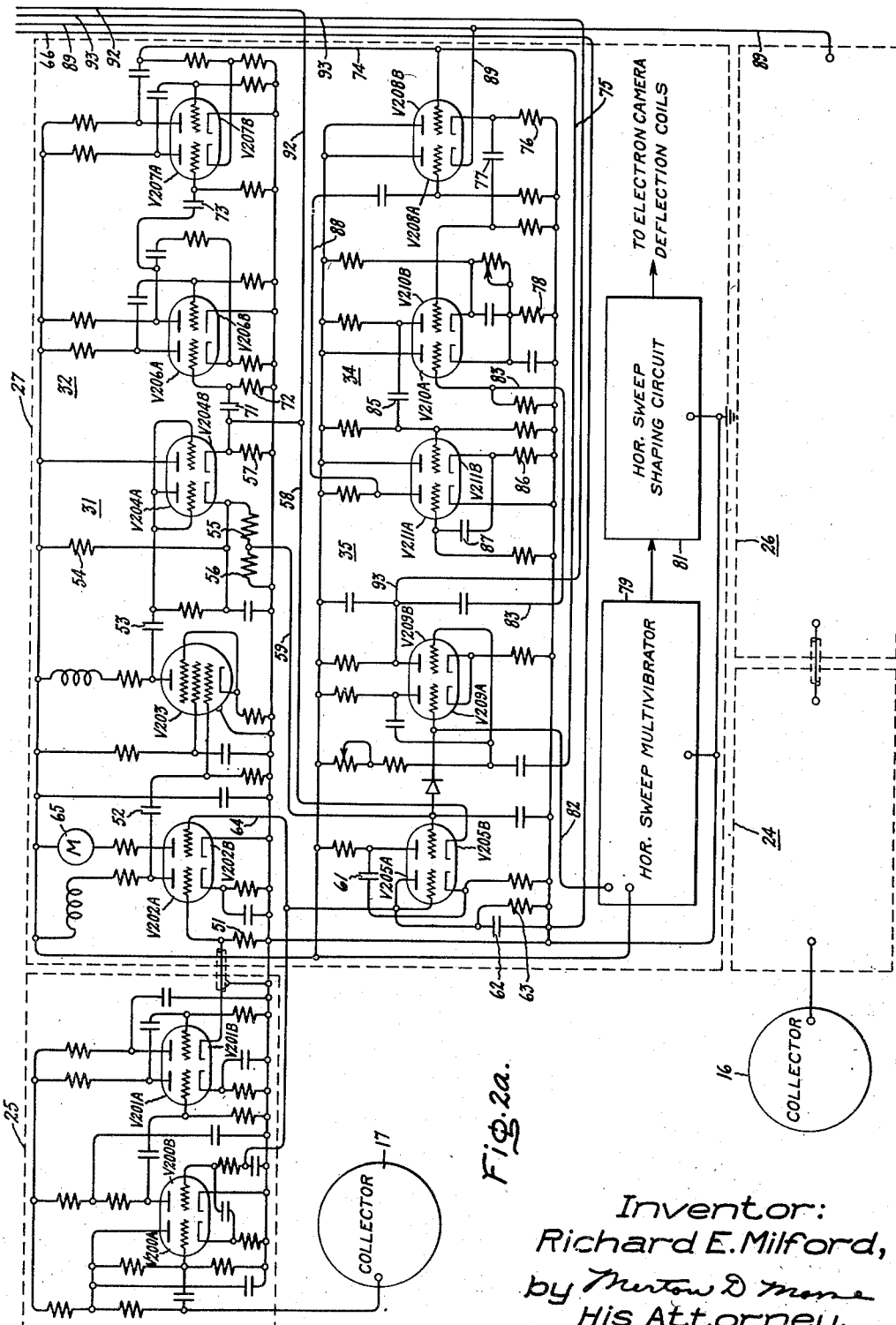

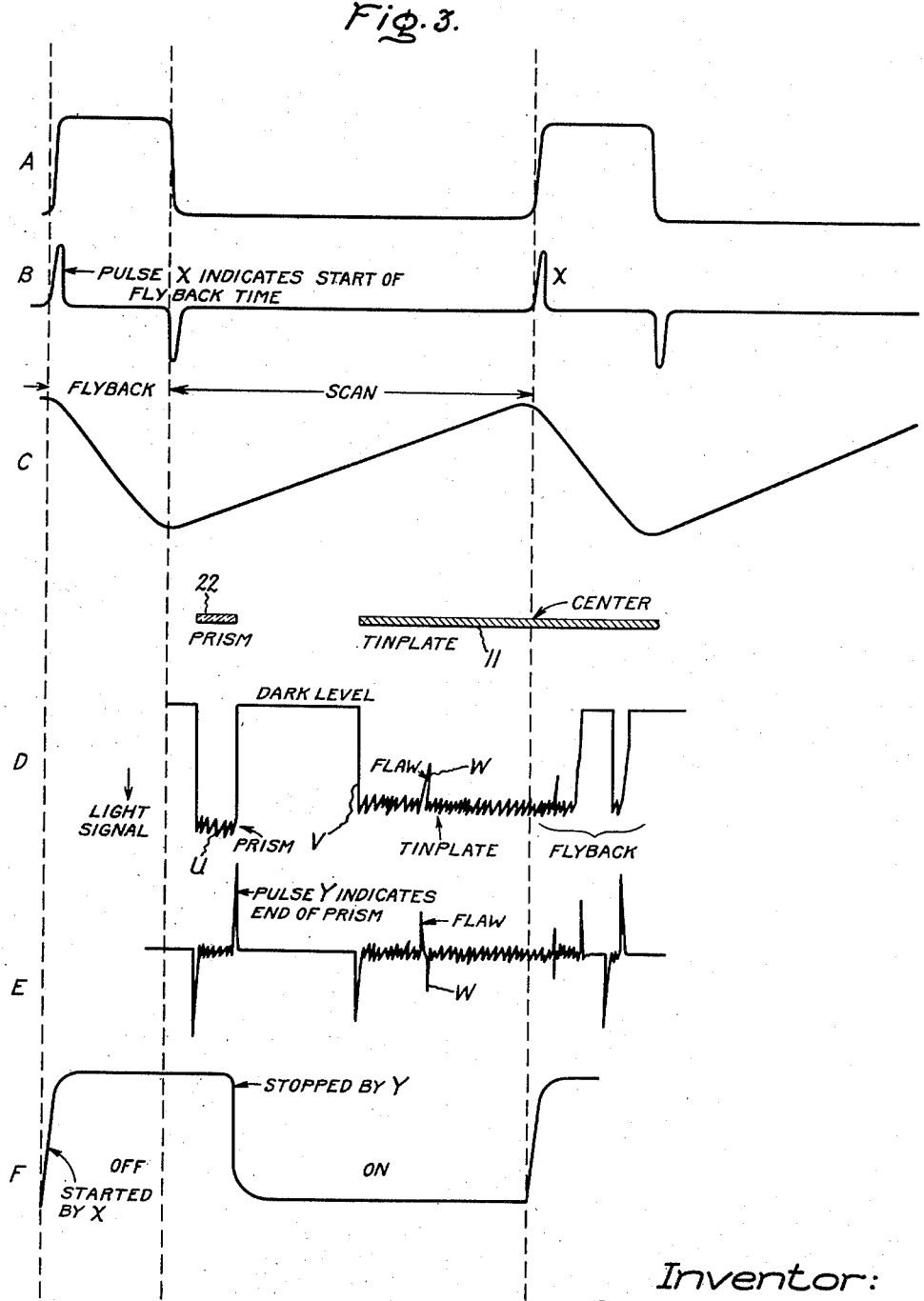

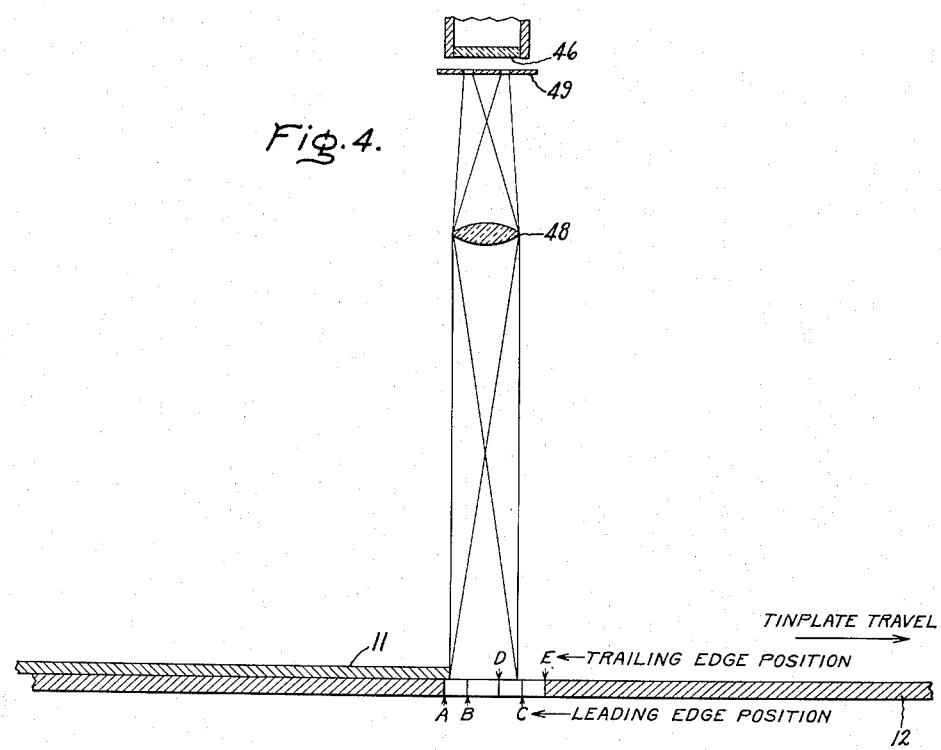
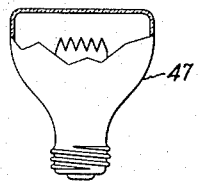
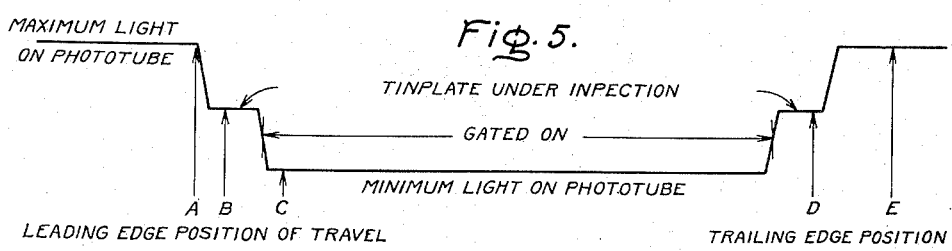

United States Patent Office 2,803,755
Patented Aug. 20, 1957

2,803,755

AUTOMATIC INSPECTION GAGE

Richard E. Milford, Schenectady, N. Y., assignor to General Electric Company, a corporation of New York Application December 16, 1954, Serial No. 475,760

20 Claims. (Cl. 250—230)

The present invention relates to an inspection gage for sheet material having a reflective surface.

More particularly, the invention relates to an automatic inspection gage utilizing electron-optical devices to view the surface of a reflective sheet of material, such as tinplate, and to develop an electric output signal indicating the existence of flaws occurring in the surface of the sheet material, or a substantial reduction in the overall reflectivity of the surface.

There are many automatic inspection gages for detecting the existence of voids in sheet material, variations in thickness or width, and other such changes in the character of the material; however, there are no presently available instruments of this type for inspecting the surface of sheet material point by point at a relatively rapid rate, and deriving an output indication of the existence of flaws as well as the overall reflectivity of the surface.

It is, therefore, one object of the present invention to provide an inspection gage for sheet material having reflective surfaces such as tinplate which is capable of detecting any sharp change in the reflective qualities of the surface of reflective material such as would be due to a scratch, or a blemish, and also to detect any low reflectivity condition.

Another object of the invention is to provide a gage of the above type which effects a point by point inspection of the surface of sheet material at a relatively rapid rate.

A still further object of the invention is to provide an automatic inspection gage having the above characteristics which are fully automatic, and entirely reliable in operation.

In practicing the invention, flaw inspection equipment is provided which includes a light source for illuminating the surface of the reflective material under inspection and electron-optics means are positioned to receive light specularly reflected from the surface of the material for producing an electric signal representative of the surface condition of the material. An output circuit is operatively coupled to the output of the electron-optics means for utilizing the electric signals produced thereby, and a comparison circuit is coupled intermediate the electron-optics device in the output circuit for comparing the amplitude of the electric signal produced by the electron-optics device to a reference level electric signal and deriving an output signal indicative of the overall reflectivity characteristics of the material under inspection. In the preferred embodiment of the invention, the light source comprises a long linear light filament for producing a line of light that extends across the entire width of the material under inspection. Also, a gating circuit is preferably included intermediate the electron-optics device in the output circuit parallel circuit relationship with the comparison circuit for passing to the output circuit pulsed electric signals produced by the electron-optics device which are representative of the occurrence of flaws in the material under inspection. Additionally, it is preferred that second electron-optic means be provided which is operatively coupled to the output circuit to render the same operative only during the periods while the material to be inspected is within the view of the first electron-optics device.

Other objects, features, and many of the attendant advantages of the invention will be appreciated more fully as the same becomes better understood by reference to the following detailed description, when considered in connection with the accompanying drawings, wherein like parts are identified by the same reference character, and wherein:

Figs. 2 and 2A are detailed circuit diagrams of the inspection gage shown in Fig. 1;

Fig. 3 is a series of graphs illustrating the voltage versus time relationship of electric output signals occurring at different points in the inspection gage shown in Figs. 1 and 2;

Fig. 4 is a cross-sectional view of the edge detector system of the gage; and

Fig. 5 is a graph illustrating the waveshape of the output signal produced by the edge detector.

Figure 1:
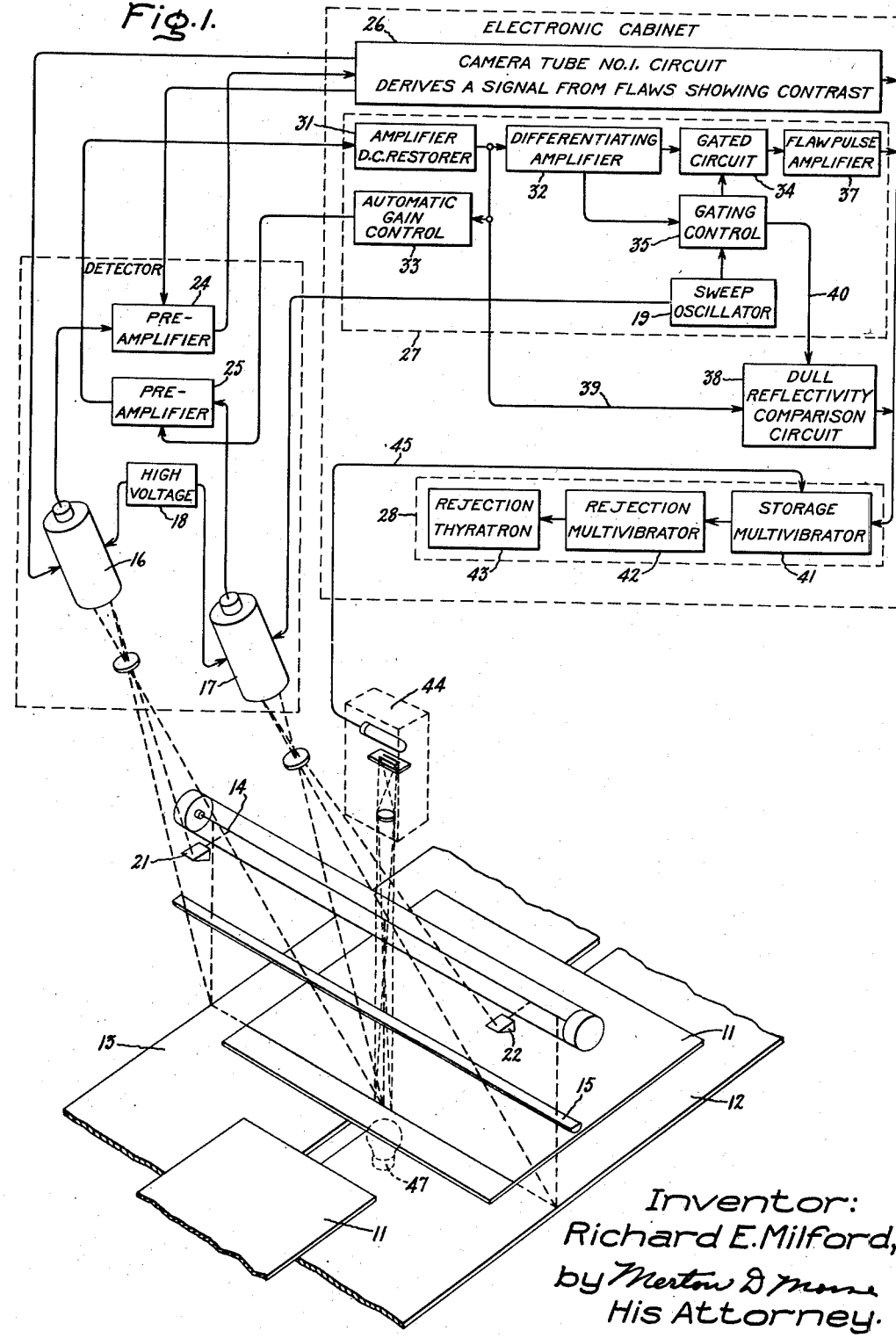
Fig. 1 is a schematic block diagram of an automatic inspection gage constructed in accordance with the invention.

The inspection gage shown in Fig. 1 of the drawings is designed to view individual sheets of material 11 which have highly reflective surfaces, such as tinplate. The sheets of a material 11 to be inspected are disposed upon a split conveyor belt separated into two parts 12 and 13 designed to move the sheets of material 11 in the direction of the arrows. Positioned directly over the conveyor belt, and hence over the sheets of material 11 to be inspected, is a long linear filament light source 14. The light source 14 is supported within a suitable housing. There is no reflector used. A cylindrical lens 15, forms an image of the lamp filament on the tinplate surface 11, and specularly reflected light from the surface is confined to a band of light which is directed into a pair of electron cameras 16 and 17. A wide angle lens in front of each electron camera forms an image of the line of tinplate surface illuminated by the lamp upon the photocathode surface of each camera tube. The electron cameras 16 and 17 are designed to have the view thereof scanned across the image of the long linear light filament specularly reflected from the surface of the sheet of material 11 at a relatively rapid rate with respect to the movement of the sheet of material in the direction of the arrow by the conveyor belt 12, 13. In this manner, point by point inspection of the special reflectivity qualities of the material is accomplished. For this purpose, high voltage supply 18 is connected to each of the electron cameras, and a suitable scanning control potential for effectively sweeping the view of the cameras in the manner described are supplied to each of the cameras 16 and 17 from respective sweep oscillators 19. The high voltage supply provides only D. C. voltages to accelerate the electrons from the front of the camera tube to the rear and then through the electron multiplier stages. The scanning is accomplished by using the magnetic fields of a horizontal deflection coil and a focus coil which enclose the body of each camera tube.

In addition to viewing the specularly reflected image of the long linear light filament, additional optical means are provided for deriving a light of reference intensity which comprises a pair of prisms 21 and 22 that image a portion of light filament directly upon the view of the respective electron cameras 16 or 17. The electron cameras 16 and 17 are preferably of the image dissector type utilizing a photocathode surface, and the cylindrical lens 15 and prisms 21 and 22 serve to image reflected light from the surface of material 11 under inspection, and light from the two portions of the light filament 14 viewed by the prisms directly upon the photocathode surface. The light then generates an axially flowing sheet of electrons whose intensity is proportional to the brightness of the light at every point. These electrons proceed from the photocathode located at the opposite end of the tube and suitable focusing and deflection means are provided for scanning the electron image back and forth across the collector thus effectively scanning the view of the cameras back and forth across the light filament image and prisms. This action results in the production of a pulsed waveshape electric signal in the output of each of the electron cameras 16 and 17, such as that exhibited in 3D of the drawings. In Fig. 3 it can be seen that as the view of electron camera 17, for example, is scanned or swept from the outer edge to about midway between the sheet of material 11, a signal pulse of substantially square wave shape is produced at U and again at V with a sharp pulse superimposed thereon at W indicative of the occurrence of a flaw. The square wave signal pulse at U is due to the scanning of the view of the electron camera tube across the prism 22 and serves to produce a reference amplitude value by which the overall reflectivity of the sheet of material 11 under inspection can be measured. Subsequently, the view of the electron camera 17 passes from the prism on to the belt 12 which is of dark background, and, hence, produces no signal output until it reaches the edge of the sheet of material 11. At this point, the camera views the reflected image of the long linear light filament 14, the amplitude of the output signal level increases in the manner indicated at V in Fig. 3 until a flaw passes within the view of the camera whereupon a sharp signal pulse such as is indicated at W is produced. The electron camera 16 serves to inspect the remaining half portion of the sheet of material 11, and to develop a similarly shaped electric output signal representative of the condition of that half of the material 11.

In developing the output electric signal shown in Fig. 3D of the drawings, a sweep signal having a square wave shape such as that shown at Fig. 3A is supplied through a suitable waveshaping circuit to develop the sawtooth wave shape signal illustrated in Fig. 3C of the drawings. This sawtooth waveshape signal is supplied to the respective electron camera 16 or 17 to cause the view thereof to be effectively scanned across the reference prism and a portion of the sheet of material 11 under inspection, respectively in the manner indicated so that the output signal developed by the electron cameras includes the square waveshape signal pulses U and V in that sequence. Subsequently, due to the steeper portion of the sawtooth waveshape scanning control signals shown in Fig. 3C, the view of the camera is brought back to its original position to produce the portion of the signal marked flyback.

The electric output signals developed by electron cameras 16 and 17 are supplied through preamplifier circuits 24 and 25 respectively and suitable connecting conductors, to electronic channels 26 and 27 respectively, and from thence to an output circuit 28. Each of the electronic channels 26 and 27 are identical in construction; hence, only one, channel 27, will be described in detail. Electric signals from preamplifier 25 and electron camera tube 17 are supplied to an amplifier and direct current restorer circuit 31 having its output connected in parallel to a differentiating amplifier 32, and to an automatic gain control circuit 33. Automatic gain control circuit 33 serves to develop an error voltage that is supplied back to a preamplifier 25 to control the gain thereof, and thereby maintain the signal level of the output electric signal supplied to the D. C. restorer circuit 31 at some predetermined constant level. Because the electric output signal from preamplifier 25 includes the square waveshaped portion U due to the prism 22, this signal portion can be used as an amplitude reference level to maintain operation of the circuit at some predetermined sensitivity, and also may be used as a systems performance indicator to alert operators against improper conditions affecting sensitivity of the system such as changes in the lamp brightness, changes in the electron camera tube sensitivity or in the amplifier stage gain. For this purpose, the automatic gain control bias signal may be displayed by suitable indicating meters connected to the output of the automatic gain control circuit 33.

The output signal from D. C. restorer circuit 31 also is supplied to differentiating amplifier 32 in which it is differentiated and amplified, and supplied to a gating circuit 34. Gating circuit 34 is gated off and on by a suitable gating control signal developed by a gating control circuit 35 whose operation is synchronized with the output scanning control signal developed by the sweep oscillator 19. The output signal of the gating circuit 34 is supplied to a flaw pulse amplifier 37, and from thence to the output circuit 28.

In addition to the above-described circuitry, which is included in both of the electronic channels 26 and 27, the electronic channel 27 has a comparison circuit 38 connected thereto intermediate the output of amplifier and D. C. restorer circuit 31 and the output circuit 28 which is connected in parallel circuit relationship with the gating circuit 34. This comparison circuit 38 has one input terminal thereof connected to the output of the amplifier and D. C. restorer circuit 31 through a conductor 39 and a second input thereof connected to the output from gating control circuit 35 through a conductor 40.

Referring again to Fig. 3 of the drawings, it can be appreciated that by differentiating the substantially square waveshaped signal shown in Fig. 3A of the drawings, a pulsed keying signal such as shown at Fig. 3B can be obtained. This differentiated signal has a positive-going pulse appearing at the beginning flyback portion of the sawtooth waveshape scanning control signal shown in Fig. 3A. Likewise, by examination of Fig. 3D of the drawing, it can be seen that a similar positive-going keying pulse is obtained by differentiating the square waveshaped portion U of the composite electric signal shown in Fig. 3D. By combining these two positive-going pulses, i. e., the pulse at X in Fig. 3B and the pulse at Y in Fig. 3E of the drawing, a suitable keying potential can be derived for controlling the gating control signal circuit 35. By supplying each of these keying pulses to the gating control signal circuit 35 and utilizing both to cut on and off a square wave generator such as a multivibrator, a suitable gating signal such as that shown in Fig. 3F of the drawing can be obtained. This gating signal can then be supplied to the gating circuit 34 to gate that circuit on and off and as a consequence, renders that circuit capable of passing signals from differentiating amplifier 32 only during that portion of the scan of the electron camera 16 and 17 when the view of the camera is on the surface of the material 11 being inspected. During the flyback portion of the scan as well as the portion of the scan wherein light from the reference prism 22 or 21 is impinging upon the electron camera, the gating circuit 34 is gated off and is incapable of passing signal pulses from the differential amplifier 32. Consequently, only sharp transient signal pulses caused by the occurrence of flaws in the surface of the material being inspected are passed to the output circuit 28.

In addition to flaw pulses passed by gating circuit 34 and flaw pulse amplifier 37 to the output circuit 28 a similar signal is supplied to the output circuit from the dull reflectivity comparison circuit 38. The output signal from the amplifier D. C. restoring circuit 31 and the gating control signal developed by the gating control circuit 35 are supplied to dull reflectivity comparison circuit 38 where the gating control circuit functions to eliminate from the D. C. restored and amplified signal illustrated in Fig. 3D of the drawings, that portion of the signal portion U due to the reference prism as well as the flyback portion of the signal. The resultant signal is then only that portion due to the material under inspection, and can be compared to a reference value potential to determine its amplitude, and hence, provide a measure of the overall reflectivity characteristic of the material under inspection. An output signal is then derived which is indicative of the overall reflectivity of the material, and is supplied to the output circuit 28 along with the flaw signal pulses derived from each of the electronic channels 26 and 27.

The output circuit 28 is connected in common to the outputs of both the electronic channels 26 and 27, as well as the output of the dull reflectivity comparison circuit 38, and comprises a bi-stable multivibrator 41, a timing multivibrator 42, and a rejection thyratron 43. By including the storage multivibrator 41 in the output circuit 28, a flaw signal pulse from either of the electronic channels 26 or 27, or from the dull reflectivity comparison circuit, supplied to the storage multivibrator causes the same to be triggered from its "normal" condition to its second state of operation in which it remains for a period of time sufficiently long to complete inspection of a single sheet of material 11. In this manner, only one flaw indicating output signal will be derived from the output circuit 28 for each sheet of material 11 regardless of the number of flaws appearing on that particular sheet. The storage multivibrator is returned to and held in its "normal" state between sheets of tinplate due to the operation of an edge detector 44, to be described more fully hereinafter.

Connected to the output of the storage multivibrator 41 is a second multivibrator 42 which serves to shape the output signal derived for the storage multivibrator 41 into a suitable triggering potential for firing a rejection thyratron 43 connected to the output thereof. The rejection thyratron 43 may then be used to actuate a relay or solenoid for controlling a rejection mechanism or the like.

Coupled to the output circuit 28 for the purpose of controlling the same is a second electron-optics device, indicated at 44, connected to the storage multivibrator 41 through a conductor 45. Second electron-optics device 44 is positioned over the conveyor belt 12, 13 which conveys the material 11 to be inspected, and comprises a phototube. As previously stated, the conveyor belt 12, 13 is split into two parts and a longitudinally extending slit extends between the two halves.

As is best shown in Fig. 4 of the drawings, the photocathode surface of the phototube 46 is positioned directly over this longitudinally extending slit, and a light source 47 is positioned beneath the belt. When there is no sheet of material 11 to be inspected disposed over the light source, light is projected up between the slit in the two belt conveyor portions 12, 13 through a condenser lens arrangement 48 and through openings in a mask 49 disposed intermediate the photocathode surface 46 and the conveyor belt 12, 13 to the photocathode surface 46. The mask 49 has two apertures therein spaced apart in the direction of travel of the sheets of material 11. As can be appreciated from an examination of Fig. 4 and from a consideration of the fact that the amplitude of the output signal generated by the photocathode surface 46 is a function of the amount of light impinging thereupon, a stepped substantially square waved potential will be developed by the device as an edge of the sheet of material approaches or leaves the area intermediate light source 47 and photocathode surface 46 thereby indicating the existence of the edge. The stepped, square waveshaped signal pulses developed by the edge detector 44 are supplied through conductor 45 to the one-shot multivibrator 41 and exercise control over the operation of the multivibrator by maintaining the same nonresponsive to electric signal from the two electronic channels 26 and 27 or from the dull reflectivity comparison circuit 38 except when a sheet of material 11 to be examined is under the view of the detector. Under the last-mentioned circumstances, the edge detector releases control of the storage multivibrator 41 so as to render the same sensitive to flaw signal pulses supplied thereto from electronic channels 26 or 27, or dull reflectivity comparison circuit 38.

In a practical embodiment of the invention, the long linear light filament 14, the cylindrical lens, the edge detector 44, the electron camera 16 and 17, the preamplifiers 24 and 25, and high voltage supply 18 are all mounted within a single structure or unit directly over the conveyor belt on which the material to be inspected is disposed. The remaining portions of the electronic channels and the output circuit 28 are all contained within an electronic cabinet which may be remotely positioned in a more convenient location. The electric signals derived from the electron cameras 16 and 17 as well as the edge detector are supplied to the electronic channels and output circuit by suitable electrical conduits.

When initially placed in operation, the edge detector 44 exercises control over the output circuit 28 so as to render the same nonresponsive to electrical signals from either of the electronic channels 26 or 27 or from the dully reflectivity comparison circuit 38. When a sheet of material 11 to be inspected comes within the view of the edge detector, and, hence, electron cameras 16 and 17, the output circuit 28, and the storage multivibrator 41 in particular, is released from control of the edge detector, and is rendered sensitive to flaw signal pulses from the electronic channels 26 or 27, or from the dull reflectivity comparison circuit 38. Because of the manner in which the edge detector operates, release occurs after a small amount of travel of the leading edge of the sheet of material 11 passed the inspecting zone of the electron camera 16 and 17, and terminates a short distance before the trailing edge of the sheet of material reaches the inspection zone. In one specific construction of the invention, the distances involved were approximately 3/16" from either end of the sheet. Upon a sheet of material 11 coming within the inspection zone, the views of the electron cameras are scanned across the image of the light filament projected thereon by the reference prism 21 or 22, across a portion of the belt to the edge of the sheet of material 11, and, thence, inwardly to approximately midway the width of the sheet. Referring to Fig. 3D of the drawings, it can be seen that as the scannings proceed it first encounters the reference prism wherein a reference square wave signal pulse indicated at U is produced. In view of the fact both of the electron cameras operate in identical fashion, it is believed sufficient to describe the operation of only one. From the reference prism, the scanning proceeds over the dark conveyor belt which reduces the amplitude level of the signal to the zero or base value, then next to the edge of the sheet of material 11 where a substantial increase in the amplitude of the signal occurs. As the scanning progresses over the sheet of material 11 surface, the reflectivity characteristics of the reference are registered in the output signal, and any flaw on the surface will appear as indicated at W superimposed upon this overall reflectivity square wave signal. Just beyond the sheet of material 11, the forward or inspecting scan of the electron camera ends, and the flyback portion begins. The speed of the flyback portion of the scan is about 4 times as fast as the inspection or forward scan, and the changes in light intensity are seen in reverse order as the view of the electron camera is suddenly passed back over the sheet of material to the edge to the initial starting point. This scanning operation is repeated approximately 10,000 times per second, as determined by the frequency of the sweep oscillator 19 in the electronic channels.

The electric signals produced in the electron cameras are supplied to the preamplifiers 24 and 25, and to each of the electronic channels 26, 27, respectively. As the electronic channels 26 and 27 are identical in construction, a description of the construction and operation of one will suffice. In the electronic channels, the signal is amplified, passed through a direct current restoring circuit 13 which serves to clamp the peak excursions of the square waveshaped electric signals at or below some predetermined amplitude level. The amplified, D. C. restored signal is then supplied to the automatic gain control circuit 33 which develops and feeds back a gain controlling error signal to the preamplifier 24 or 25 to maintain the amplitude of the signal supplied to the electronic channels at some predetermined value. Also, the amplified D. C. restored signal is supplied to the differentiating amplifier 32 where it is differentiated and supplied to the gating circuit 34. The output of differentiating amplifier 32 also is supplied to the gating control circuit 35 along with a signal from the sweep oscillator 19, to develop a gating control signal that is in turn supplied to the gating circuit 34 to control the operation of the same and allow the passage therethrough of flaw signal pulses produced only when the electron cameras 16 and 17 are viewing a sheet of material 11. These flaw signal pulses are amplified by the flaw pulse amplifier 37 and supplied to the output circuit 38. Simultaneously, the output signal from the D. C. restoring circuit 31 is supplied to the dull reflectivity comparison circuit 38 along with the gating signal obtained from the gating control circuit 35. The comparison circuit 38 then utilizes these two signals to extract only that portion of the D. C. restored signal which is produced during scanning of the sheet of material 11, and compares the extracted signal portion to reference potential to derive an output signal that is indicative of the overall reflectivity characteristics of material 11. These signals are supplied to the storage multivibrator 41, which, upon the occurrence of a flaw signal pulse or a signal pulse due to dull reflectivity in one of the sheets of material, is triggered from one state of operation thereof to the other. This results in the production of the timing pulse that fires the rejection thyratron 43 and actuates the rejection mechanism or some other suitable indicating device that signals the occurrence of a faulty sheet of material. Subsequent to each actuation of the one-shot multivibrator 41 in this manner, the edge detector signal supplied by the conductor 45 from the edge detector unit 44 serves to restore the multivibrator to its initial or sensitive state upon the occurrence of a succeeding sheet of material 11 coming within the view of the electron camera, and, hence, the edge detector 44.

The details of construction of the electronic channels 26, 27 are best shown in Fig. 2 of the drawings wherein electron camera 16 and electron camera 17 are shown connected to the respective electronic channels. In view of the fact that the construction of both of the channels is identical, the description will be restricted to channel 27 which is connected to the output of electron camera 17. Electron camera 17 has the electron collector thereof connected through a suitable resistance capacitor coupling circuit to a four-stage resistor-capacitor coupled amplifier circuit comprised by a pair of duo-triode tube V-200 and V-201. The last stage of this amplifier circuit forms a cathode follower amplifier wherein a resistor 51 serves as a cathode load resistor for the triode section V-201B, and as an input load resistor for an amplifier stage formed by triode section V-202A of a duo-triode tube V-202. Triode section V-202A has the anode thereof connected through a suitable coupling capacitor 52 to the control grid of a pentode amplifier tube V-203, which in turn has the anode thereof coupled through a suitable coupling capacitor 53 to the D. C. restoring circuit 31. As each of the amplifier circuits heretofore identified comprise conventional resistor-capacitor coupled amplifiers, and the cathode-follower amplifier circuits' construction and operation are well-known, further description of the characteristics of these circuits is believed unnecessary.

The direct current restoring circuit 31 comprises a triode section V-204A of a duo-triode wherein the anode and control grid are connected together, and the cathode thereof is connected to the junction of a potential divider comprised by three resistors 54, 55 and 56, connected in series circuit relationship between the source of positive plate potential and ground. The interconnection of the anode and grid of triode V-204A causes this tube section to operate as a diode rectifier. The anode of section V-204A is connected to the control grid of the second triode section V-204B of the duo-triode which has a load resistor 57 connected in the cathode circuit thereof to cause the same to operate as a cathode follower amplifier.

In operation, the direct current restoring circuit 31 operates to maintain the amplitude level of the squarewave shape electric signal illustrated in Fig. 3D of the drawings at or below some predetermined reference value. The circuit functions in the following manner to achieve this result. Assuming that the square-wave shape signal shown in Fig. 3D is supplied to the anode of the diode section V-204A it can be appreciated that this signal must obtain some predetermined positive value above the direct current bias supplied to the cathode of the diode section in order to render the diode section conductive. Therefore, as long as the signal supplied is below this value, the diode section will not conduct, and the signal will be supplied to the control grid of the cathode follower section V-204B unaltered. However, should the amplitude level of the signal supplied to the diode section rise above this predetermined reference level, the diode section is rendered conductive, and effectively connects the control grid of the cathode follower triode section V-204B to the reference level point on the voltage divider 54, 55, 56 to which the cathode of the diode section is connected. Consequently, it can be seen that the diode section acts to clamp the direct current amplitude level of the signal at the predetermined reference level established by the voltage divider 54, 55, and 56. The potential appearing across cathode load resistor 57 is connected back through a conductor 58 to the cathode of the triode section V-205B, and a reference potential is supplied to the control grid of this triode section from the junction of resistors 55 and 56 of the potential divider through a conductor 59. The anode of the triode section of V-205B is coupled through a coupling capacitor 61 to the cathode of triode section V-205A whose anode and control grid are connected together to form a diode rectifier. The anode of this diode rectifier is connected to a suitable smoothing circuit comprised by a capacitor 62 and resistor 63, and also is connected through a conductor 64 to the control grid of triode section V-202B. Triode section V-202B has the anode thereof connected to a source of plate potential through an indicating meter 65 which provides an output indication for the value of the rectified potential appearing across the smoothing circuit 62, 63. The direct current output potential appearing across smoothing circuit 62, 63 is also supplied back through a conductor 66 to the control grid of the second triode section V-200B of duo-triode tube V-200 for the purpose of controlling the amplification of this triode section.

In operation, the potential appearing across the cathode load resistor 57 is compared to the reference potential obtained from the voltage divider 54, 55, 56 and, if the value thereof drops below this level, the triode section V-205B is rendered conductive supplying a negative potential through coupling capacitor 61 to the cathode of the diode section V-205A. Upon this occurrence, diode section V-205A conducts, and the direct current potential produced by this action is smoothed by the smoothing circuit 62, 63. The potential thus produced is then supplied through conductor 66 to the control grid of the triode section V-200B of duo-triode V-200, and serves to maintain the amplification of this triode section at a value such that the overall gain of the circuit up to the cathode follower amplifier V-204B is maintained at a constant value. An indication of the value of this gain controlling signal is obtained from the meter 65 which indicates generally the condition of the circuit up to a point at which the automatic gain control potential is obtained.

The potential appearing across the cathode follower load resistor 57 also is supplied to differentiating amplifier 32 formed by a differentiating circuit comprised of a capacitor 71 and a resistor 72 which coact to differentiate square-wave shaped signals supplied thereto. The differentiated electric signal is then supplied to the control grid of the first triode section V–206A of a two-stage resistance-capacitance coupled feedback stabilized amplifier formed by the duo-triode tube V–206. The anode of the second triode section V–206B of this amplifier is coupled through a coupling capacitor 73 to the control grid of a triode section V–207A which together with the second triode section V–207B of the duo-triode comprises a two-stage resistance-capacitance coupled, feedback stabilized amplifier that further amplifies the differentiated electric signals supplied thereto from the first two-stage amplifier V–206A, V–206B. The output of two-stage amplifier V–207A, V–207B is then supplied through a conductor 74 to the control grid of a cathode-follower amplifier formed by the triode section V–208B of a duo-triode tube, and is also supplied through a conductor 75 to the control grid of a triode section V–209B, for a purpose to be described more fully hereinafter. Triode section V–208B has a cathode load resistor 76 connected to the cathode thereof that is coupled through a coupling capacitor 77 to the control grid of a triode section V–210B comprising a part of the gating circuit 34.

Gating circuit 34 is formed by the two triode sections V–210A, and V–210B, of a duo-triode tube which have the cathodes thereof connected to a common cathode load resistor 78. The differentiated electric signal appearing across cathode load resistor 76 of cathode follower V–208B is supplied to the control grid of triode section V–210B and triode section V–210A has a gating signal supplied to the control grid thereof from the gating control signal generator 35. The gating control signal generator is comprised by the two triode sections V–209A and V–209B that form a conventional resistance-capacitance coupled multivibrator having one state of stable operation. The multivibrator V–209A and V–209B is in turn synchronized with the operation of the gating control signal generator 19 which comprises signal generator multivibrator 79 having one output thereof connected to a scanning voltage shaping circuit 81 that in turn is connected to the deflection coils of the electron camera tube 17. The scanning signal generator 79 also has the output thereof connected through the conductor 82 to the control grid of triode section V–209A of the gating multivibrator V–209A, V–209B for synchronizing the operation of the gating multivibrator with the scanning control potential supplied to the electron camera tube 17. The gating multivibrator serves to develop a square-wave shaped gating potential illustrated in Fig. 3F that is supplied through the conductor 83 to the control grid of triode section V–210A. As can readily be determined from an examination of this circuit, when the triode section V–210A, is conducting, the positive potential developed across a common cathode load resistor 78 serves to maintain the triode section V–210B in a non-conducting condition. Consequently, under such conditions, flaw pulse signals supplied to the control grid of the triode section V–210B cannot be passed through the gating circuit. There are times when triode section V–210A is not maintained cut off by the square-wave shaped signal supplied thereto from the gating multivibrator V–209, and the triode section V–210B can be rendered conductive by signal pulses supplied thereto from the cathode load resistor 76 of cathode follower amplifier V–208B. In these instances, such signals will be passed through the gating circuit.

Signals passed by the gating circuit 34 and in particular triode section V–210B are supplied through a coupling capacitor 85 to the control grid of triode section V–211B which has the cathode thereof connected to a cathode load resistor 86 that in turn is connected through a coupling capacitor 87 to the control grid of a triode section V–211A. The triode section V–211B thus comprises a cathode follower amplifier, and the triode section V–211A is connected thereto as resistance-capacitance coupled amplifier stage. The output of amplifier section V–211A is connected through conductor 88, control grid of the triode section V–208A which comprises a cathode follower amplifier wherein the cathode is directly coupled through a conductor 89 to the output circuit 28 in a manner to be described more fully hereinafter. As the operation of the circuit elements described hereinabove is believed to be obvious from the description already presented, further discussion thereof is not though to be necessary.

The triode section V–208A is cathode coupled through the conductor 89 across a resistor 91 connected in the output circuit 28, and a similar output triode section in the electronic channel 26 is likewise cathode coupled through the conductor 89 across the same resistor. In addition, a triode section in the dull reflectivity comparison circuit 38 to be described hereinafter also is cathode coupled through conductor 89 across the resistor 91. All three of these elements; that is, electronic channel 27, electronic channel 26, and the dull reflectivity comparison circuit 38 then operate to control the potential developed across the resistor 91 to thereby control the operation of the output circuit 28.

The comparison circuit 38 comprises a duo-triode tube V–212 having the control grid of one triode section V–212B connected through a conductor 92 to the cathode load resistor 57 of cathode follower amplifier V–204B, and having the control grid of a second triode section V–212A connected through a conductor 93 to the output of the gating multivibrator V–209A, V–209B. The triode sections V–212A and V–212B have a common cathode load resistor 94 which is cathode coupled to the cathode circuit of a triode section V–213B serves as a cathode follower amplifier. By this construction, when one of the triode sections is conducting, the other will be cut off due to the positive bias developed across the common cathode load resistor 94. Consequently, the gating signal supplied to the control grid of triode section V–212B from the gating multivibrator will maintain this circuit nonresponsive to signal pulses supplied to the control grid of triode section V–212B from the cathode load resistor 57 of cathode follower amplifier V–204B at all times except when the signal portion due to scanning the view of the electron camera over the surface of the material 11 to be inspected, is occurring. During the blanking phase of the operation, no output signal is passed by the output cathode follower stage V–213A due to a blocking potential applied to the control grid thereof through a coupling capacitor 95. During the phase of operation when triode section V–212B is sensitive to flaw signal pulses from cathode follower V–204B, the signal developed across the cathode-load resistor 94 will be that due only to the portion of the signal indicative of the reflectivity qualities of the surface being inspected, and this signal portion will be amplified by the cathode follower amplifier V–213B and supplied through a coupling capacitor to a rectified network comprising a pair of selenium rectifiers 96 and 97 and a smoothing circuit comprised by a capacitor 98 and resistor 99 connected in parallel therewith. The output of this rectifier network is supplied to the control grid of the triode section V–213A which is cathode coupled through the conductor 89 across the resistor 91 in the output circuit 28. If desired, the triode section V–213A may have a gas neon tube 101 connected in the plate circuit thereof for indicating conductance of the triode section V–213A which provides a measure of the reflectivity qualities of the sheet of material under inspection, and is visually observable to an operator of the instrument.

The output circuit 28 includes a bi-stable storage multivibrator formed by the two triode sections V–214A and V-214B of a duo triode tube. The control grid of triode section V-214B is connected to the resistor 91 through a capacitor 103, and has a positive bias supplied thereto from a suitable resistance voltage divider connected between the source of positive plate potential and ground. As previously set forth, the resistor 91 constitutes a common cathode load resistor for the triode section V-213A of the dull reflectivity comparison circuit 38, the cathode load resistor for the output cathode follower stage formed by triode section V-208A of electronic channel 27, and it also comprises a cathode load resistor for a corresponding output cathode follower stage in the electronic channel 26. Consequently, it can be appreciated that the resistor 91 serves to couple output flaw signals from each of the aforementioned component parts of the circuit into the bi-stable multivibrator formed by the two triode sections V-214A and V-214B. These two triode sections have a common cathode load resistor 106 connected to the cathodes thereof, and the anodes and control grids of each of the triode sections are interconnected through suitable resistance-capacitance coupling circuits. A positive bias potential is supplied to the control grid of the triode section V-214B from the voltage divider comprised by resistors 104, 105, and a similar positive bias is applied to the control grid of the triode section V-214A from a voltage divider formed by a plurality of resistors 107, 108, 109, 126 connected in series circuit relationship between the source of positive plate potential and ground. As the construction and operation of bi-stable multivibrators of the type comprised by the duo-triode section V-214A and V-214B are relatively well known in the art, a detailed description of its operation will not be given. Briefly, however, the bias applied to the control grid of the triode section V-214A is controlled by the edge detector 44 so that this triode section is normally conductive, and the bias across the common cathode load resistor 106 is sufficiently positive to maintain the triode section V-214B cut off. When the edge detector releases control to start the inspection of a sheet, the conductive state of V-214A and V-214B are not changed. Upon the application of a flaw signal pulse across the resistor 91 due to an output signal from either one of the electronic channels 26 or 27, or from the dull reflectivity comparison circuit 38, the triode section V-214B is rendered conductive, and the positive bias developed across the common cathode load resistor 106 is sufficient to render the triode section V-214A non-conductive. This condition is maintained due to a change in plate and grid potentials of the two triode sections. The triode sections remain in the second state of operation unless they are forced to return to the original condition by the application of a bias change on the control grid of the triode section V-214A, from the edge detector unit connected thereto through the conductor 45 in a manner to be described more fully hereinafter. Output signals derived from the bi-stable multivibrator are supplied also across the conductor 45 to the cathode of a triode section V-215A comprising a part of the output circuit. A positive bias is supplied to the control grid of the triode section V-215A from a voltage divider comprised by a pair of resistors 112 and 113 connected in series circuit relationship between the source of plate potential and ground. The conduction state of section V-215A is arranged to be opposite to section V-214A, such that section V-215A conducts only while a flaw signal is "in storage," i. e., from the time that V-214A is made non-conductive by the detection of a flaw until V-214A is again made conductive at the end of inspection of the individual sheet of tinplate. The anode of V-215A is connected through a coupling capacitor 114 to the control grid of the triode section V-215B. Capacitor 114 and the grid resistor of V-215B differentiate the signal to give a positive pulse signal when V-215A becomes non-conductive. The cathode of triode section V-215B is connected through a conductor 115 to a resistor 116 and the control grid of a triode section V-216B. The resistor 116 comprises a part of a voltage divider further consisting of a resistor 117 connected in series circuit relationship with resistor 116 between the source of positive plate potential and ground. The triode section V-216B and triode section V-216A of a duo-triode tube together, comprise a one-shot multivibrator to control the duration of firing of a thyratron V-217 connected to the anode of triode section V-216A through a coaxial cable 118 and coupling capacitor 119. The multivibrator comprised by triode sections V-216A and V-216B, has a common cathode resistor 120, and has the anode of the triode section V-216B connected through a timing capacitor 121 to the control grid of the triode section V-216A.

In operation, the square-wave shaped flaw signal pulse produced by bi-stable multivibrator V-214A, V-214B, is supplied to the conductor 45 to the cathode of the triode section V-215A. This tube serves to amplify the square-wave shape signal pulse, and the differentiated signal is then supplied to the cathode coupling circuit comprised by the triode section V-215B which cathode couples the positive differentiated pulse signal to the input of the one-shot multivibrator comprised by triode sections V-216A and V-216B. This multivibrator changes state for a definite timed interval before returning to its mono stable state. The square-wave signal voltage output of this multivibrator is supplied through the conductor 118 to the control grid of the thyratron tube V-217 and cause the same to fire for the duration of the square wave. This tube has a suitable relay 123 connected in the anode circuit thereof for actuating a rejection mechanism, a flaw marking mechanism, or some other type of apparatus for indicating the presence of a faulty sheet of material in the inspection zone of the equipment.

In order to assure that the output circuit 28 is rendered operative only during the times when a sheet of material 11 is within the inspection zone of the electron cameras 17 and 16, the edge detector unit 44 is provided. As set forth in earlier portions of the specification, the edge detector unit is positioned so that the cathode 46 of a phototube 125 observes the edge of the sheets of material 11 as the same progresses along the conveyor lines, and under the inspection zone of the electron cameras 16 and 17. The photocathode 46 emits electrons in a beam the intensity of which is dependent upon the amount of light impinging on the photocathode surface. These electrons then are collected by an anode of the photocell and supplied to the control grid of a triode section V-218A which comprises one stage of a two-stage direct coupled amplifier further constituted by a triode section V-218B of a duo-triode. The output signal from this two stage amplifier is supplied from a cathode load resistor 126 connected to the cathode of the triode section V-218B, through the conductor 45 to the cathode of triode section V-215A and to the control grid of the triode section V-214A. Resistor 126 comprises a part of the voltage divider further consisting of resistors 107, 108, and 109 connected in a series circuit relationship between the source of positive plate potential and ground. Consequently, it can be appreciated that varitions in potentials across resistor 126 control the value of potential applied to the control grid of triode section V-214A of the storage multivibrator. Likewise, the potential across resistor 126 controls the positive bias applied to the cathode of the triode section V-215A. From a consideration of these factors, it can be seen that when the triode section V-218B is conducting due to the fact that no sheet of material 11 is in the inspection zone of the equipment, an increased positive potential is applied to the cathode of triode section V-215A which maintains this tube non-conductive. Hence, no output signal can be supplied through the triode section V-215A to the driving multivibrator V-216 and thyratron V-217. However, when a sheet of material 11 is in the inspection zone of the equipment, the cathode potential of V-215A is determined by the grid potential of V-214A. When the grid potential of V-214A is normal (V-214A conducting), then V-215A will remain non-conducting. However, when a flaw signal causes V-214A to be non-conducting, then the grid potential of V-214A decreases and thereby causes V-215A to conduct. It also can be appreciated that when the triode section V-213B is rendered conductive an increased positive potential is supplied to the control grid of the triode section V-214A of the storage of the multivibrator which returns that multivibrator to its original conducting condition. Hence, at the end of inspection of each sheet of material 11, it is assured that the storage multivibrator V-214 will be returned to its initial operating condition, and, hence, be in readiness to receive any flaw signals that might be supplied thereto from succeeding sheets of material occurring on the conveyor.

When placed in operation, the equipment functions in the following manner: As a sheet of material 11 comes down a conveyor line it passes between the light source 47 and photocell unit 125 of the edge detector assembly 44. This section cuts off the light to the photocell unit in two distinct steps, and results in producing a stepped square-wave shaped output signal pulse such as indicated in Fig. 5 of the drawings. This signal pulse is supplied through the conductor 45 to the triode section V-215A and V-214A to release the output circuit 28 from the control of the edge detector, and renders the output circuit sensitive to incoming flaw signal pulses supplied thereto from either of the electronic channels 26, 27, or the dull reflectivity comparison circuit 38. The electron cameras 16 and 17 then act to effectively scan point-by-point the reflected image of the long linear light filament which illuminates the surface of the material under inspection. As the operation of each of these units is identical, only the operation of electron camera 17 and its associated circuitry in electronic channel 27 which is identical to the electronic channel 26, will be described.

The electron camera 16 serves to scan one-half of the sheet of material under inspection, while the electron camera 17 inspects the remaining half. Consequently, as the view of the electron camera is scanned from its outer edge inwardly to about midway the width of the sheet of material, produces first a signal pulse such as is shown at U in Fig. 3D of the drawing as the view of the camera passes over the reference prism, then across the dark area due to the conveyor belt on which the material is disposed, and upon arriving at the edge of the sheet of material, it can be seen that the signal intensity increases to a level shown at V. This portion of the signal is indicative of the overall reflectivity of the sheet of material and, hence, can be used to derive an indication of that characteristic. Also any flaws or defects that occur in the surface of the material of the sheet 11 produce pulses such as shown at W that can be utilized to indicate the occurrence of such flaws. The view of the camera is then quickly swung back in the portion of the signal marked "flyback" to again repeat the cycle at some predetermined scanning frequency. Consequently, it can be appreciated that the signal supplied from the electron cameras 16 and 17 is substantially a square-wave shape signal upon which flaw pulses are superimposed. This signal is preamplified by the preamplifiers V-200A, V-200B, V-201A and coupled through the cathode follower stage V-201B to the input of the amplifier stage V-202A. The output of amplifier V-202A is then supplied through amplifier V-203 to the direct current clamping triode section V-204A which restores the signal supplied thereto to a predetermined reference level in the event of overamplification in the preceding stages, and to the cathode follower stage V-204B. At this point the signal developed across load resistor 57 appears as illustrated in Fig. 3D of the drawing, and is supplied to the automatic gain control amplifier V-205B. If this signal level is below some predetermined value determined by the potential selected from voltage divider 54, 55, 56, an error signal is supplied to the triode rectifier V-205A which derives an automatic gain controlling signal that is supplied back through conductor 66 to the control grid of the triode section V-200B in the preamplifier stages. An indication of the magnitude of this gain controlling signal and hence, the overall condition of the equipment, is obtained by means of the triode section V-202B and indicating meter 65.

The potential appearing across cathode load resistor 57 is also supplied to differentiating circuit 71, 72 where it is differentiated to produce the pulsed waveshape signal illustrated in Fig. 3E of the drawings. This pulsed waveshape signal is then amplified by the two, two-stage, feedback stabilized, amplifiers comprised by the duo-triodes V-206, V-207 and supplied to the cathode follower stage V-208B which serves to couple the amplified, pulsed waveshape signal into the gated circuit 34. This gated circuit 34 is comprised of the two triode sections V-210A and V-210B and the common cathode load resistor 78 so that when one of the triode sections is conducting the other is rendered insensitive. A gating signal is supplied to triode V-210A from the gating multivibrator V-209A, V-209B which is synchronized with the scanning control signal developed by the horizontal sweep multivibrator 79 having its output connected to the gating multivibrator V-209 through the conductor 82 and synchronized by pulse signals supplied thereto through conductor 75. The gating multivibrator serves to develop the substantially square-wave shape gating signal illustrated in Fig. 3F of the drawings, and supplied the same through conductor 83 to the control grid of triode section V-210A. From an examination of the waveshape of this gating signal, and its phase relation with respect to the differentiated signal shown in Fig. 3E, it can be seen that the gating circuit 34 serves to remove that portion of the differentiated signal which is due to the reference prism and flyback portion of the signal thereby leaving only that portion of the signal produced while the view of the electron camera is on the surface of the material 11 being inspected. A flow pulse in the remaining portion of the signal is passed by the gating circuit to amplifiers V-211A and V-211B to the cathode follower output triode V-208A which serves to couple the flaw pulse signal portion into the output circuit 28 through conductor 89. An electronic channel 26 is identical in construction to channel 27, a similar output signal is derived therefrom and supplied to the output circuit 28 through conductor 89. Hence, should a flaw signal pulse, such as that indicated at W in Fig. 3E appear in the output of either of the electron cameras 16, 17, such a flaw signal pulse produces an output signal that is supplied across conductor 89 to the output circuit 28. These flaw signal pulses are applied to the bi-stable storage multivibrator formed by the two triode sections V-214A and V-214B causing the same to be shifted from its initial stage of operation to a second stage of operation, and results in producing a square-wave shape signal pulse that is supplied through the conductor 45 to a second stage of operation, and results in producing a square-wave shape signal pulse that is supplied through the conductor 45 to the cathode of triode section V-215A. As control of this triode section has been released by the edge detector unit 44, the square-wave flaw signal is passed by triode section V-215A and then differentiated upon entering the cathode coupling circuit formed by triode section V-215B. Only the positive differentiated pulse which occurs at the end of inspection of a sheet with a flaw can be passed from section V-215B to the driving multivibrator V-216A, V-216B. Multivibrator V-216A, V-216B then develops a timed square-wave signed to control the firing of thyratron tube V-217 resulting in the actuation of the relay or alternatively a solenoid or discharge magnet 123 connected in the anode circuit of the thyratron. Once bi-stable multivibrator V-214A and V-214B has been thus shifted from its initial condition of operation to its second state of operation, it can no longer respond to succeeding signal pulses resulting from further flaws occurring in a particular sheet of material until it is returned to its initial condition. This does not occur until the view of the edge detector unit 44 senses the trailing edge of the particular sheet of material 11, and produces a stepped output signal that is supplied through the conductor 45 and returns one-shot multivibrator V-214A, V-214B to its initial condition of operation. Consequently, it can be appreciaited that the circuit operates to detect only one flaw in a sheet of material, and additional flaws occurring in any particular sheet of material 11, do not actuate the output circuit.

In addition to flaw signal pulses produced by electronic channels 26 and 27, the dull reflectivity circuit 38 operates to produce an output signal pulse indicative of the overall sensitivity of a sheet of material 11 being lower than some predetermined value. This circuit operates by utilizing triode section V-212A, which has the gating signal developed by gating multivibrator V-209A, V-209B applied to the control grid thereof through conductor 93, and the triode section V-212B which has the amplified and D. C. restored signal appearing across cathode load resistor 57 supplied to the control grid thereof through conductor 92. The triode sections V-212A and V-212B by virtue of the common cathode load resistor 94 then operates to eliminate the portion of the signal due to the reference prism and the flyback portion of the signal shown in Fig. 3D of the drawings, and results in passing only that portion of the signal which provides a true indication of the overall reflectivity of the sheet of material 11. This signal portion is supplied through cathode coupling circuit V-213B, which compares the magnitude of the signal to a reference value potential obtained from a voltage divider and supplied to the control grid thereof. In the event that the amplitude of this signal portion is less than desired, a signal pulse is produced in the plate circuit of triode section V-213B which is supplied to the rectifier network 96 through 99 where it is rectified and applied to the cathode coupling triode V-213A. The rectified voltage serves as a gate which cuts off V-213A as long as the reflectivity of the tinplate is sufficiently high. In the event the tinplate is dull, then the rectified voltage diminishes and section V-213A then serves to couple differentiated pulses supplied from the gating circuit conductor 93 through capacitor 95 into the bi-stable storage multivibrator V-214A, V-214B to cause the same to operate in the previously described manner.

From the foregoing description, it can be appreciated that the invention provides an inspection gage for sheet material having reflective surfaces, such as tinplate, which is fully automatic and entirely reliable in operation. The gage is capable of automatically detecting any sharp changes in the reflective qualities of a surface such as would be due to a scratch, rustspot, or other blemish, and also of detecting any overall low reflectivity condition of the surface. It makes this inspection in a point-by-point manner, at a rate which is sufficiently rapid to allow the same to be used for production line inspection.

Obviously, other modifications and advantages of the invention are possible in the light of the above teachings and it is therefore to be understood that changes may be made herein which are within the full intended scope of the invention and defined by the appended claims.

What I claim as new and desire to secure by Letters Patent of the United States is:

1. Flaw inspection equipment for moving sheet material having reflective surfaces comprising a long linear filament light source for producing a line of light extending across the width of the material being inspected, electron-optics means for viewing the surface of sheet material to be examined, means for periodically scanning the view of said electron-optics means along the line of light at a fast rate relative to the rate of movement of the sheet material to thereby produce a series of pulsed electric signals representative of the condition of the surface of the material, and an output circuit for utilizing the electric signal produced by said electron-optics means.

2. Flaw inspection equipment for moving sheet material having reflective surfaces comprising a long linear filament light source for producing a line of light extending across the width of the material being inspected, electron-optics means for viewing the surface of sheet material to be examined, means for periodically scanning the view of said electron-optics means along the line of light at a fast rate relative to the rate of movement of the sheet material to thereby produce a series of pulsed electric signals representative of the condition of the surface of the material, an output circuit for utilizing the electric signal produced by said electron-optics means, and a gating circuit connected intermediate said output circuit and said electron-optics means for supplying to said output circuit only the pulsed electric signals produced by said electron-optics means during a desired portion of the scan.

3. Flaw inspection equipment for moving sheet material having reflective surfaces comprising a long linear filament light source for producing a line of light extending across the width of the material being inspected, first electron-optics means for viewing the surface of sheet material to be examined, means for periodically scanning the view of said electron-optics means along the line of light at a fast rate relative to the rate of movement of the sheet material to thereby produce a series of pulsed electric signals representative of the condition of the surface of the material, an output circuit for utilizing the electric signal produced by said electron-optics means, second electron-optics means positioned to view the material being inspected for sensing the leading and trailing edges of such material and developing an output control signal indicative of the occurrence of such edges, the output of said second electron-optics means being operatively coupled to said output circuit for rendering the same operative only during periods while material to be inspected is within the view of said first electron-optics means.

4. Flaw inspection equipment for moving sheet material having reflective surfaces comprising a long linear filament light source for producing a line of light extending across the width of the material being inspected, electron-optics means for viewing the surface of sheet material to be examined, scanning control means for periodically scanning the view of said electron-optics means along the line of light at a fast rate relative to the rate of movement of the sheet material to thereby produce a series of pulsed electric signals representative of the condition of the surface of the material, an output circuit for utilizing the electric signal produced by said electron-optics means, a gating circuit connected intermediate said output circuit and said electron-optics means for supplying to said output circuit only the pulsed electric signals produced by said electron-optics means during a desired portion of the scan, a gate control circuit operatively coupled to said scanning control means and to said gating circuit for synchronizing the operation of said gating circuit with scanning of said electron-optics means, and second electron-optics means positioned to view the material being inspected for sensing the leading and trailing edges of such material and developing an output control signal indicative of the occurrence of such edges, the output of said second electron-optics means being operatively coupled to said output circuit for rendering the same operative only during periods while material to be inspected is within the view of said first electron-optics means.

5. Flaw inspection equipment for moving sheet material having reflective surfaces comprising a long linear filament light source for producing a line of light extending across the width of the material being inspected, electronoptics means for viewing the surface of sheet material to be examined, means for periodically scanning the view of said electron-optics means along the line of light at a fast rate relative to the rate of movement of the sheet material to thereby produce a series of pulsed electric signals representative of the condition of the surface of the material, an output circuit for utilizing the electric signal produced by said electron-optics means, and a comparison circuit coupled intermediate said electron-optics means and said output circuit for comparing the amplitude of the electric signal produced by the electron-optics means to a reference level electric signal and deriving an output signal representative of the overall reflectivity characteristics of the material under inspection.

6. Flaw inspection equipment for moving sheet material having reflective surfaces comprising a long linear filament light source for producing a line of light extending across the width of the material being inspected, electron-optics means for viewing the surface of sheet material to be examined, scanning control means for periodically scanning the view of said electron-optics means along the line of light at a fast rate relative to the rate of movement of the sheet material to thereby produce a series of pulsed electric signals representative of the condition of the surface of the material, an output circuit for utilizing the electric signal produced by said electron-optics means, a gating circuit connected intermediate said output circuit and said electron optics means for supplying to said output circuit only the pulsed electric signals produced by said electron-optics means during a desired portion of the scan, a gate control circuit operatively coupled to said scanning control means and to said gating circuit for synchronizing the operation of said gating circuit with scanning of said electron-optics means, and a comparison circuit coupled intermediate said electron-optics means and said output circuit in parallel circuit relationship with said gating circuit for comparing the amplitude of the electric signal produced by the electron-optics means to a reference level electric signal and deriving an output signal representative of the overall reflectively characteristics of the material under inspection.

7. Flaw inspection equipment for moving sheet material having reflective surfaces comprising a long linear filament light source for producing a line of light extending across the width of the material being inspected, electron-optics means for viewing the surface of sheet material to be examined, means for periodically scanning the view of said electron-optics means along the line of light at a fast rate relative to the rate of movement of the sheet material to thereby produce a series of pulsed electric signals representative of the condition of the surface of the material, an output circuit for utilizing the electric signal produced by said electron-optics means, a comparison circuit coupled intermediate said electron-optics means and said output circuit for comparing the amplitude of the electric signal produced by the electron-optics means to a reference level electric signal and deriving an output signal representative of the overall reflectively characteristics of the material under inspection, and second electron-optics means positioned to view the material being inspected for sensing the leading and trailing edges of such material and developing an output control signal indicative of the occurrence of such edges, the output of said second electron-optics means being operatively coupled to said output circuit for rendering the same operative only during periods while the material to be inspected is within the view of said first electron-optics means.

8. The combination set forth in claim 6 further characterized by a second electron-optics means positioned to view the material being inspected for sensing the leading and trailing edges of such material and developing an output control signal indicative of the occurrence of such edges, the output of said second electron-optics means being operatively coupled to said output circuit for rendering the same operative only during periods while material to be inspected is within the view of said first electron-optics means.

9. Flaw inspection equipment for moving sheet material having reflective surfaces comprising a light source for illuminating the surface of the material under inspection, electron-optics means positioned to receive light specularly reflected from the surface of the material and for producing an electric signal representative of the surface conditions of the material, an output circuit operatively coupled to the output of said electron-optics means for utilizing the electric signals produced thereby, and a comparison circuit coupled intermediate said electron-optics means and said output circuit for comparing the amplitude of the electric signal produced by electron-optics means to a reference level electric signal and deriving an output signal of the overall reflectively characteristics of material under inspection.

10. Flaw inspection equipment for moving sheet material having reflective surfaces comprising a light source for illuminating the surface of the material under inspection, electron-optics means positioned to receive light specularly reflected from the surface of the material and for producing an electric signal representative of the surface conditions of the material, a differentiating circuit coupled to the output of said electron-optics means for selectively passing only the transient pulsed electric signals representative of flaws occurring in the material being inspected, an output circuit operatively coupled to the output of said differentiating circuit for utilizing the pulsed electric signals produced thereby, a comparison circuit coupled intermediate said electron-optics means and said output circuit in parallel circuit relationship with said differentiating circuit for comparing the amplitude of the electric signal produced by electron-optics means to a reference level electric signal and deriving an output signal of the overall reflectivity characteristics of material under inspection, and automatic gain control means operatively coupled to the output of said electron-optics means for automatically maintaining the amplitude of the output signals produced thereby at some predetermined amplitude level.

11. Flaw inspection equipment for moving sheet material having reflective surfaces comprising a light source for illuminating the surface of the material under inspection, electron-optics means positioned to receive light specularly reflected from the surface of the material and for producing an electric signal representative of the surface conditions of the material, an output circuit operatively coupled to the output of said electron-optics means for utilizing the electric signals produced thereby, a gating circuit connected intermediate said output circuit and electron-optics means for supplying to said output circuit only the pulsed electric signals produced by said electron-optics means, a comparison circuit coupled intermediate said electron-optics means and said output circuit in parallel circuit relationship with said gating circuit for comparing the amplitude of the electric signal produced by electron-optics means to a reference level electric signal and deriving an output signal of the overall reflectivity characteristics of material under inspection, and second electron-optics means positioned to view the material being inspected for sensing the leading and trailing edges of such material and developing an output control signal indicative of the occurrence of such edges, the output of said second electron-optics means being operatively coupled to said output circuit for rendering the same operative only during periods while material to be inspected is within the view of said first electron-optics means.

12. The combination set forth in claim 11 further characterized by a differentiating circuit coupled intermediate the output of said electron-optics means and said gating circuit for selectively passing to said gating circuit only transient pulsed electric signals representative of flaws occurring in the material being inspected, and by automatic gain control means operatively coupled to the output of said electron-optics means for automatically maintaining the amplitude of the output signals produced thereby at some predetermined amplitude level.

13. Flaw inspection equipment for moving sheet material having reflective surfaces comprising a long linear light filament for producing a line of light extending across the width of the material under inspection, electron camera means, optical means for imaging the line of light reflected from the material on said electron camera means, reference optical means for producing a direct image of a portion of the light filament on said electron camera means, scanning control means coupled to said electron camera means for periodically scanning the view of said electron camera means across the direct image of said filament produced by said reference optical means and sequentially along the reflected line of light image to thereby effect a point by point inspection of the material and to produce a composite pulsed electric signal representative of the level of intensity of the light produced by said filament and of the condition of the surface of the material, and an output circuit for utilizing the electric signal produced by said electron-camera means.

14. Flaw inspection equipment for moving sheet material having reflective surfaces comprising a long linear light filament for producing a line of light extending across the width of the material under inspection, electron camera means, optical means for imaging the line of light reflected from the material on said electron camera means, reference optical means for producing a direct image of a portion of the light filament on said electron camera means, scanning control means coupled to said electron camera means for periodically scanning the view of said electron camera means across the direct image of said filament produced by said reference optical means and sequentially along the reflected line of light image to thereby effect a point by point inspection of the material and to produce a composite pulsed electric signal representative of the level of intensity of the light produced by said filament and of the condition of the surface of the material, automatic gain control means operatively coupled to the output of said electron camera means for automatically maintaining the amplitude of the output signals produced thereby at some predetermined amplitude level, an output circuit for utilizing the electric signal produced by said electron camera means, a gating circuit connected intermediate said output circuit and said electron camera means for supplying to said output circuit the pulsed electric signals produced by said electron camera means during a desired portion of the scan, and a gate control circuit operatively coupled to said scanning control means and to said gating circuit for synchronizing the operation of said gating circuit with scanning of said electron camera means.

15. The combination set forth in claim 14 further characterized by second electron-optics means positioned to view the material being inspected for sensing the leading and trailing edges of such material and developing an output control signal indicative of the occurrence of such edges, the output of said second electron-optics means being operatively coupled to said output circuit for rendering the same operative only during periods while material to be inspected is within the view of said first electron-optics means.

16. The combination set forth in claim 14 further characterized by a comparison circuit coupled intermediate said electron camera means and said output circuit in parallel circuit relationship with said gating circuit for comparing the amplitude of the electric signal produced by the electron camera means to a reference level electric cameras, reference optical means for producing a direct image of a portion of the light filament on one of said electron cameras, scanning control means coupled to each of said electron cameras for periodically scanning the view of its associated camera across the direct image of said filament produced by said reference optical means and sequentially along a portion of the reflected line of light image and to scan the view of the remaining electron camera across the remaining portions of the reflected line of light image to thereby effect a point by point inspection of the material and to produce a composite pulsed electric signal representative of the level of intensity of the light produced by said filament and of the condition of the surface of the material, automatic gain control means operatively coupled to the output of each of said electron cameras for automatically maintaining the amplitude of the output signals produced thereby at some predetermined amplitude level, an output circuit common to both said electron cameras for utilizing the electric signal produced by said electron-optics means, a gating circuit connected to each of said electron cameras for applying to said output circuit the pulsed electric signals produced by said electron cameras during a desired portion of the scan, a gate control circuit operatively coupled to the scanning control means and to the gating circuit associated with each of said electron cameras for synchronizing the operation of said gating circuit with scanning of said electron cameras; second electron-optics means positioned to view the sheet material under inspection, and a mask having two apertures spaced apart in the direction of travel of the sheet material therein, the mask being positioned intermediate one of the signal and deriving an output signal representative of the overall reflectivity characteristics of the material under inspection.

17. Flaw inspection equipment for moving sheet material having reflective surfaces comprising a long linear light filament for producing a line of light extending across the width of the material under inspection, electron camera means, optical means for imaging the line of light reflected from the material on said electron camera means, reference optical means for producing a direct image of a portion of the light filament on said electron camera means, scanning control means coupled to said electron camera means for periodically scanning the view of said electron camera means across the direct image of said filament produced by said reference optical means and sequentially along the reflected line of light image to thereby effect a point by point inspection of the material and to produce a composite pulsed electric signal representative of the level of intensity of the light produced by said filament and of the condition of the surface of the material, automatic gain control means operatively coupled to the output of said electron camera means for automatically maintaining the amplitude of the output signals produced thereby at some predetermined amplitude level, a differentiating circuit coupled to the output of said electron camera means for selectively passing only the transient pulsed electric signals representative of flaws occurring in the material being inspected, an output circuit including a storage multivibrator for utilizing the electric signal produced by said differentiating circuit, a gating circuit connected intermediate said output circuit and said differentiating circuit for supplying to said output circuit the pulsed electric signals produced by said differentiating circuit during a desired portion of the scan, and a gate control circuit operatively coupled to said scanning control means and to said gating circuit for synchronizing the operation of said gating circuit with scanning of said electron camera means.

18. The combination set forth in claim 17 further characterized by second electron-optics means positioned to view the material being inspected for sensing the leading and trailing edges of such material and developing an output control signal indicative of the occurrence of such edges, the output of said second electron-optics means being operatively coupled to said output circuit for rendering the same operative only during periods while material to be inspected is within the view of said first electron-optics means, and a comparison circuit coupled intermediate said electron camera means and said output circuit in parallel circuit relationship with said gating circuit for comparing the amplitude of the electric signal produced by the electron camera means to a reference level electric signal and deriving an output signal representative of the overall reflectivity characteristics of the material under inspection.

19. Flaw inspection equipment for moving sheet material having reflective surfaces comprising a long linear light filament for producing a line of light extending across the width of the material under inspection, a pair of electron cameras positioned side by side, opetical means for imaging the line of light reflected from the material on said electron cameras and the moving sheet material, with the output of the second electron-optics means being operatively coupled to the output circuit for rendering the same operative only during periods while material to be inspected is within the view of the electron cameras.

20. In electro-optical inspection apparatus for moving sheet material, means for indicating the presence or absence of sheet material to be inspected in an inspection area, comprising electron optics means positioned to view the sheet material under inspection, and a mask having two apertures spaced apart in a direction of travel of the sheet material, said mask being positioned intermediate the electron optical means and the sheet material, a light source positioned on the opposite side of the sheet material to direct light toward said electron optics means whereby the light from said source through said two apertures is sequentially interrupted by a traveling sheet of material moving into the inspection area and sequentially re-established by a sheet of material moving out of the inspection area.

References Cited in the file of this patent

UNITED STATES PATENTS

| | | |
|---|---|---|
| 1,998,950 | Cockrell | Apr. 23, 1935 |
| 2,203,706 | Stockbarger | June 11, 1940 |
| 2,548,590 | Cook | Apr. 10, 1951 |
| 2,576,529 | McKenney et al. | Nov. 27, 1951 |